United States Patent

Gara et al.

[15] 3,657,486

[45] Apr. 18, 1972

[54] TIME DIVISION MULTIPLEX PAX OF THE FOUR WIRE TYPE

[72] Inventors: George Gara, Wembley Park; Roy Charles Thorncroft, London, both of England

[73] Assignee: International Standard Electric Corporation, New York, N.Y.

[22] Filed: July 9, 1970

[21] Appl. No.: 53,573

[30] Foreign Application Priority Data

July 11, 1969 Great Britain ......................35,065/69

[52] U.S. Cl. ....................179/18 J, 179/15 AW, 179/15 BY, 179/18 AF, 179/18 GF

[51] Int. Cl. ..........................................................H04j 3/00

[58] Field of Search .........179/18 AF, 18 GF, 15 AQ, 15 AT, 179/15 BM, 15 BY, 15 AW

[56] References Cited

UNITED STATES PATENTS

| | | | |
|---|---|---|---|
| 3,213,202 | 10/1965 | Flowers | 179/15 AT |
| 3,132,210 | 5/1964 | Adelaar | 179/18 GF |
| 3,311,883 | 3/1967 | Schmitz et al. | 179/18 GF |
| 3,366,882 | 1/1968 | Briley | 179/15 BM |
| 3,281,538 | 10/1966 | Harding | 179/15 BY |
| 3,291,914 | 12/1966 | Bowers | 179/18 GF |
| 3,458,658 | 7/1969 | Aro | 179/15 AQ |
| 3,300,587 | 1/1967 | Knight et al. | 179/18 AF |

*Primary Examiner*—Kathleen H. Claffy
*Assistant Examiner*—David L. Stewart
*Attorney*—C. Cornell Remsen, Jr., Walter J. Baum, Paul W. Hemminger, Charles L. Johnson, Jr., James B. Raden, Delbert P. Warner and Marvin M. Chabin

[57] ABSTRACT

This is a TDM-PAX of the four-wire type, in which the switches for the two directions of speech sample transmissions are physically separate from each other. This separation facilitates arranging the switches so that the proper matching of inter-switch cabling is facilitated. Separate time positions are used within a slot for signalling and speech. Information other than speech is transmitted by varying the width of the crosspoint control pulses.

2 Claims, 3 Drawing Figures

Patented April 18, 1972 3,657,486

3 Sheets-Sheet 1

Inventor
G. Gara - R. C. Thorncroft

By O. A. Warner
Attorney

Patented April 18, 1972

3,657,486

3 Sheets-Sheet 2

TIME DIVISION MULTIPLEX PAX OF THE FOUR WIRE TYPE

The present invention relates to automatic telecommunication exchanges in which connections are established using time division multiplex techniques.

According to the present invention, there is provided an automatic telecommunication exchange, in which telecommunication connections are set up via time-division multiplex paths with each said connection using separate paths for the two directions of transmission, in which each connection is set up by interconnecting the calling line and the wanted line via one or more stages of switching, in which each of the switches used in said switching stages only handles the intelligence to be conveyed in one of said direction of transmission, and in which the switches for said two directions of transmission are physically separated from each other.

According to the present invention, there is also provided an automatic telephone exchange, in which communication connections are set up via time-division multiplex paths with each said connection using separate paths for the two directions of transmission, in which the subscriber's lines served are divided into groups within each of which groups a time division channel is permanently allocated to each of the lines of a group, in which each connection is set up by connecting the calling line at his time position via one or more stages of co-ordinate matrix switches to control equipment individually allocated to the call and by connecting the wanted line at the wanted line's time position via one or more stages of co-ordinate matrix switches to the same said control equipment, said control equipment including means to transfer modulation from the calling line's time position channel to the wanted line's time position channel in one direction of transmission and means to transfer modulation from the wanted line's time position channel to the calling line's time position channel in the other direction of transmission, in which the co-ordinate matrix switches used in the switching stages have semi-conductor crosspoints and each said switch only handles intelligence to be conveyed in one of said directions of transmission, in which the matrix switches for said two directions of transmission are physically separated from each other, but are controlled in synchronism with each other for the two directions of transmission, and in which each said unidirectional matrix switch is assembled on a single support member of an insulating material.

An embodiment of the invention will now be described with reference to the accompanying drawings, in which FIG. 1 represents part of a single module from which a co-ordinate matrix switch for switching between time division multiplex highways is assembled, and a controlling gating network associated therewith.

Figure 1:
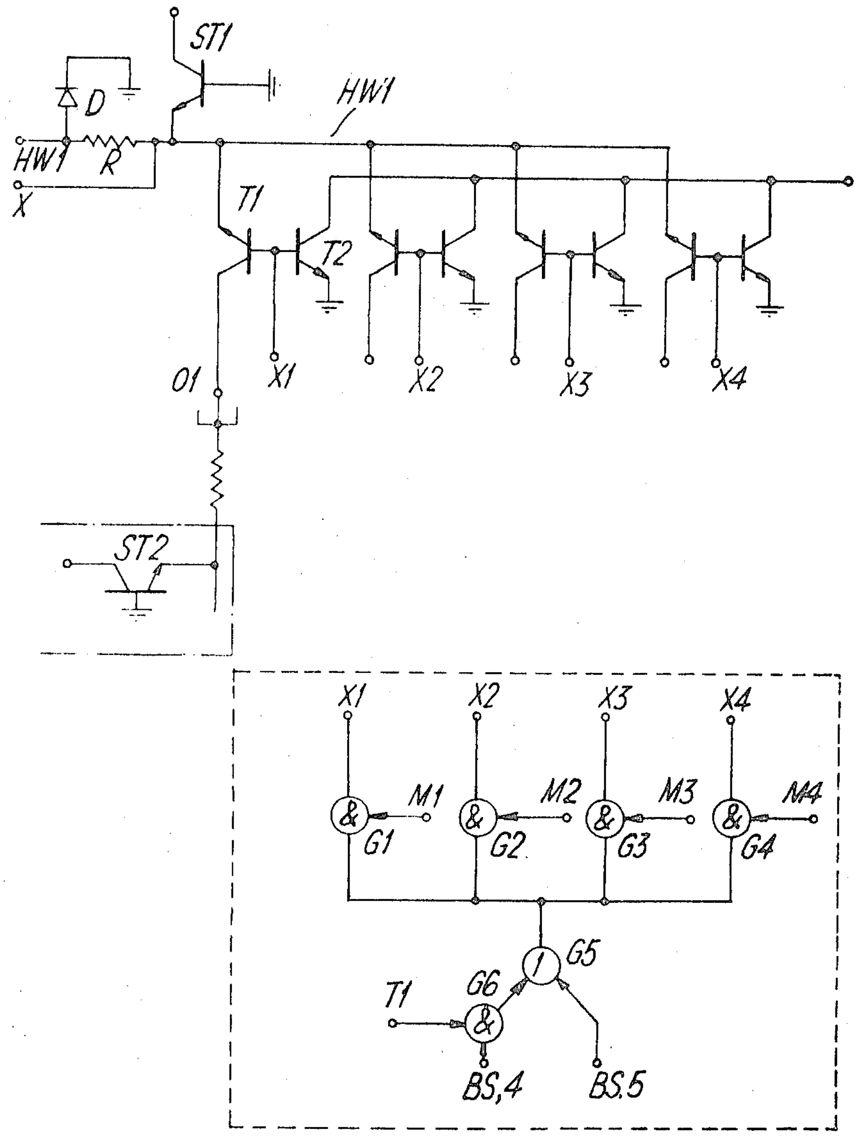

The arrangements described herein were developed specifically for use in a telephone exchange in which pulse amplitude modulation (PAM) is used, but it is also applicable to other forms of telephone or telecommunication exchange in which time division multiplex techniques are used. For instance it could be used in systems in which the intelligence is conveyed by pulse code modulation.

An example of an exchange using pulse amplitude modulation for which the present invention is particularly suitable, and in fact for which the present invention was developed, is described in some detail in a paper entitled "Time Division Private Automatic Exchange" by D.L.A.Driver, T.H.Flowers and G.W.Hughes, at pages 115 to 121 of "Electrical Communication," Vol. 44 (1969) No. 2. Another paper which describes the same exchange is entitled "A Fully Electronic PAX," also by D.L.A.Driver, which was read on Thursday, Apr. 24, 1969, during the Institution of Electrical Engineers Conference on Switching Techniques for Telecommunication Networks, which was held in London.

The exchange operates on the so-called "fixed pulse" system, i.e., each time division channel is permanently allocated to a particular line, the lines being divided into groups each served by a time division multiplex system having separate "go" and "return" speech transmission paths, so that the exchange is of the so-called four-wire type. It will be appreciated, of course, that the invention is also applicable to telephone exchanges of the so-called "variable pulse" type. The multiplex highways in the "fixed pulse" exchange described herein, are interconnected via co-ordinate matrix switching stages, whose crosspoint devices use transistors, with control equipments called audio links for transferring speech between a calling and a wanted line's time position.

Thus the calling line's time division multiplex highways (one for "go" and one for "return") are connected via one or more switching stages to one "side" of an audio link, this connection being effective on each occurrence of the calling line's time position, and the wanted line's highways are connected via one or more switching stages to the other "side" of the same audio link at the wanted line's time position. The audio link performs what is in effect, a "demodulate-then-remodulate" function for each direction of transmission.

As applied to a system of the above nature, the present invention provides that the switching stages via which connections are set up use physically separate switches for the "go" and the "return" directions of transmission. This physical separation of the switches for the two transmission directions facilitates the termination of the inter-stage wiring with impedances appropriate to the characteristic impedance of the connection. Thus all long or relatively long leads which are used in such connections can be terminated on transistor emitter circuits which are suitably matched.

The switches used are of a modular nature, each switch being built up from modules each of which includes four (or any other suitable number) of crosspoints. Each such module, which can be an integrated circuit unit, can be used as a single row or column in a "4 × 4" matrix, or as part of a row or a column in a larger matrix. It will be appreciated that the fact that a matrix switch can be assembled from a number of integrated circuit units will facilitate the construction of these matrix switches and will render them relatively cheap. Certainly they will be very cheap as compared with a switch assembled solely from discrete components.

It is also possible in an exchange such as described above for the signalling, i.e., line looping, loop disconnect, dialling, etc., the exchange described herein to be done using pulse duration modulation of the time division pulses. That is, the pulse width is altered so that the time for which a crosspoint is active differs for different channels which are in use. This will in certain cases simplify the signalling techniques.

Referring now to FIG. 1, this shows in its upper portion one of the modules from which a switch is assembled, and which consists of four of the crosspoints. Considering one such crosspoint, it includes a speech path transistor T1 whose emitter is connected to the incoming highway HW1 and whose collector is connected to an output connection 01 for the output highway, and a second transistor T2 used as a busy indicator. When a speech path is to be set up via the crosspoint a positive pulse appears on its control input X1, which is connected to the bases of both of the transistors T1 and T2. This pulse opens the speech transistor T1, so that it can pass a modulated pulse from the input highway to the output highway, and also switches on the busy transistor T2, so that the busy output is effective.

Also connected to the input highway is its matching resistor R, to the "inner" end of which is connected the emitter of a supervisory transistor ST1, via which the condition of the highway is supervised by control circuitry. A further supervisory transistor ST2 is shown connected to the output highway. This latter transistor is associated with an adjacent switching stage, and has therefore been enclosed by a chain-dotted line. These supervisory transistors are enabled, as will be seen later at times at which the speech path transistors are not effective, so that the supervision can occur at different times to the speech transmission, and thus obviate the risk of interference between supervision and speech.

Also connected to the highway, but at the "outer" end of the resistor R is a diode D via which the highway is earthed. This diode discharges the capacities of the highway between channels, thus eliminating cross talk. It will be appreciated that in order to eliminate cross talk between adjacent channels, there is a small time gap between the adjacent channels, and this gap is used for highway discharge.

We will now consider the portion of FIG. 1 which is encased in broken lines. This includes a set of gates such as G1, the output of which is connected to the bases of the crosspoint including transistors T1 and T2, and similar gates G2, G3, G4, for the other crosspoints of the unit. These crosspoint control gates have control inputs from the memories which control the switching of the transistors, these being labelled M1, M2, M3 and M4, and a further common control input connected to an OR-gate G5. The OR-gate G5 referred to above, has two control inputs, one of which comes from the output of an AND-gate G6, and the other comes from a time position pulse BS5. This pulse BS5 occupies approximately two thirds of the duration of a time division multiplex channel, and is the speech portion of the time division channel. The control inputs to the gate G6 are a pulse at T1, which is the time position in which a signal is passed from the highway illustrated to the next highway, while BS4, the other control input of G6 is the signal slot. This signal slot is a relatively short portion of the time division channel, and there is a small gap between it and the speech slot BS5. Thus it will be seen that the signalling and the speech are conveyed at separate times. Furthermore, the connections from the highways via the supervisory transistors to the controlling apparatus are rendered effective by means (not shown) during the signal slot BS4.

Figure 2:
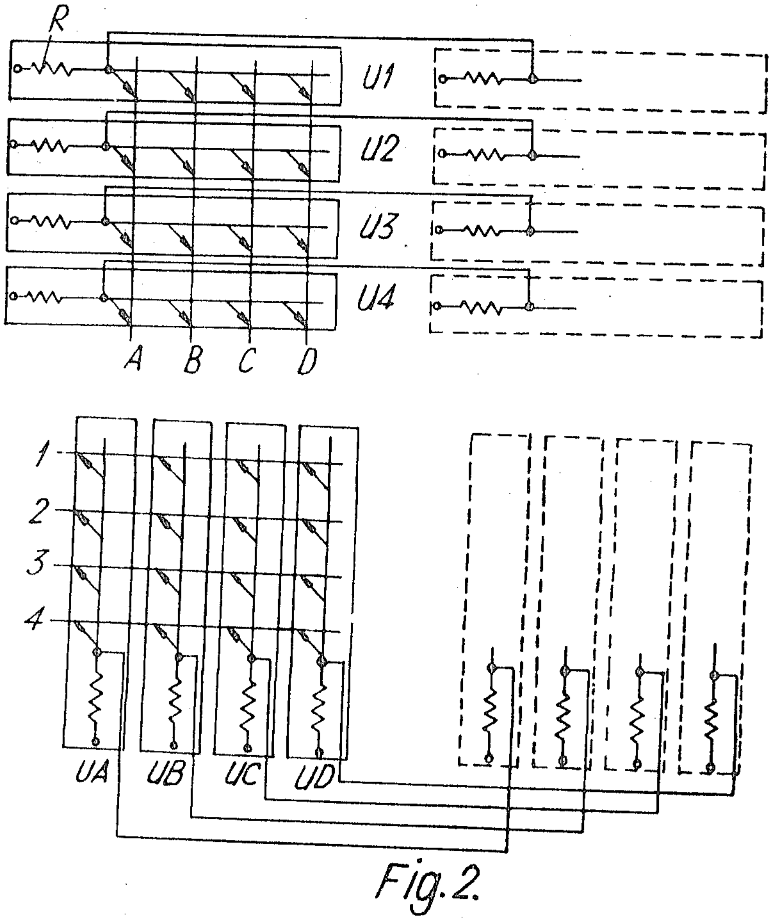
FIG. 2 shows how modules such as shown in the upper portion of FIG. 1 can be assembled into co-ordinate matrix switches.

Turning now to FIG. 2, this illustrates schematically how modules such as that shown in FIG. 1 are assembled to form a single time division multiplex switch. The upper half of FIG. 2 relates to the switch for one direction of transmission while the lower half of FIG. 2 relates to that for the other direction of transmission. Considering the upper part, the connections A, B, C and D, represent interconnections of the output highways such as O1 in FIG. 1, and this fact is illustrated in FIG. 1 by the multipling sign shown immediately below the reference numeral 01. Thus the interconnection of four units such as U1, U2, U3 and U4, as shown in the top left hand quarter of FIG. 2 produces a 4 × 4 matrix.

In order to produce a a larger matrix, other modules are connected to the modules shown in FIG. 2. Thus if the row has to include two or more units, they are interconnected in the manner shown in FIG. 2, whereby the outputs X (FIG. 1) connected to the "inner" ends of the matching resistors are interconnected. Thus only a single matching resistor is used for each row. Similar connections are shown for each of the rows of the switch in the upper portion of FIG. 2. It will be appreciated that where a larger number of columns than four is needed, then additional four-crosspoint modules would be used with their output highways connected to the output highway represented by A, B, C and D. The lower portion of FIG. 2 shows schematically the arrangement of the modules for the reverse direction of transmission. It will be seen that since the direction of transmission is the opposite of that shown in upper half of FIG. 2, then each of the modules is, in effect, turned through 90° as compared with those in the upper portion. Thus turning through 90° is not essential, but does simplify interconnection between the various modules. The interconnection whereby for the reverse direction of transmission additional modules are provided is generally similar to that for the upper part of FIG. 2, as shown in FIG. 2.

In FIG. 2 the crosspoint transistors are represented by short oblique lines each bearing an arrowhead. These arrowheads should not be confused with transistor emitters.

Figure 3:
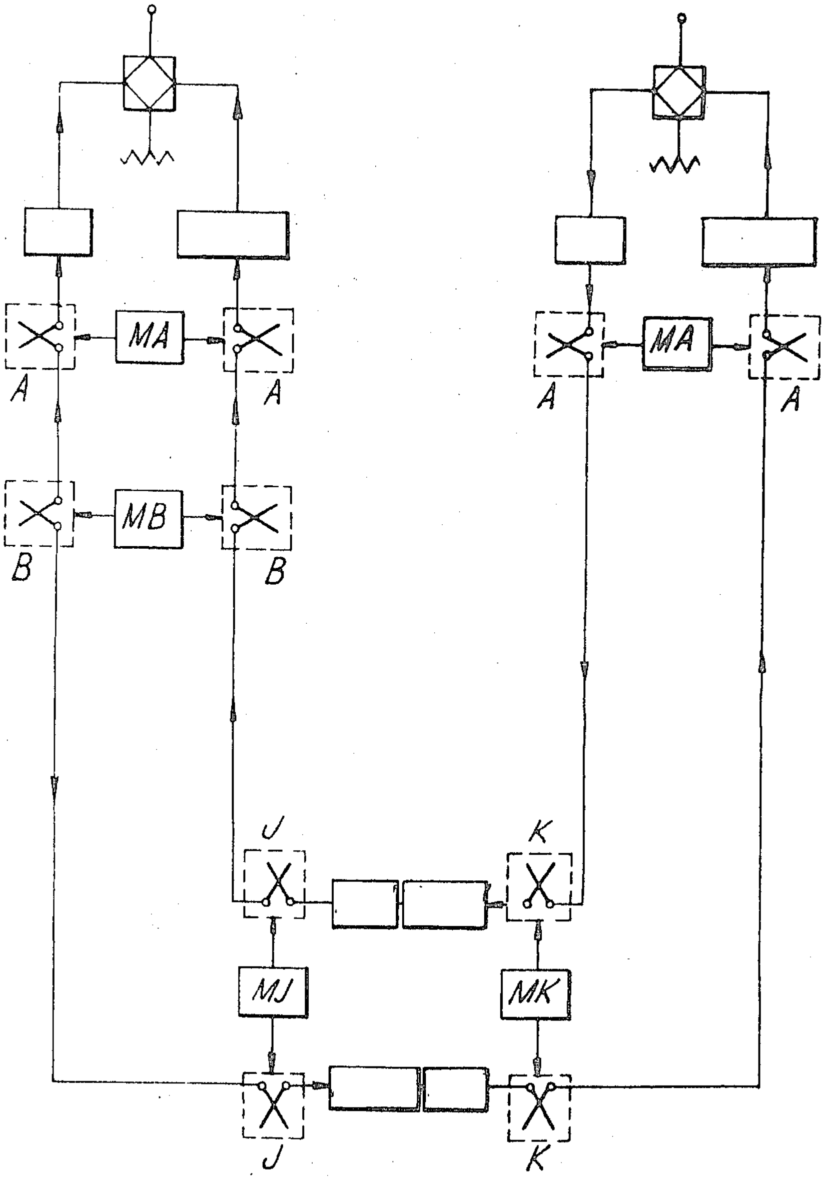
FIG. 3 represents schematically an exchange in which switches such as shown in FIG. 2 are used.

FIG. 3 shows in highly simplified form the transmission path of an exchange to which the invention is applicable. It will be seen that this diagram is similar to, but somewhat simplified as compared with, one of the figures which illustrates the above-quoted paper in "Electrical Communication." In FIG. 3, however, each of the scissors-like symbols which represents a co-ordinate matrix switch is shown within broken lines, to emphasise the fact that the switches used for the two directions of transmission are physically separated from each other.

When a connection has been set up, the calling subscriber's line is connected via a hybrid H to a modulator for the "go" direction of transmission, and this modulator samples his speech and thus amplitude modulates it on to a time division multiplex pulse, and also to a demodulator from which speech is reconstituted from the amplitude modulated pulses arriving from the wanted subscriber. The two A switches, one for the "go" direction and one for the "return" direction of transmission are controlled by the memory MA which controls the crosspoint gates via gating networks similar to those shown in the lower portion of FIG. 1. The connections extend from the A switches via the B switches, controlled by their memories MB, the J switches, controlled by their memories MJ, to the audio links. Each of these audio links includes a portion for each direction of transmission, each such portion including a demodulator followed by a modulator. In certain cases these two pieces of apparatus may be, in effect, combined, by the use of some sort of pulse stretching and sampling arrangement.

Continuing from the audio links, we reach the K switches, controlled by the memories MK, and come back via A switches, controlled by memories MA, serving the wanted subscriber. Here also the same arrangement of modulator, demodulator and hybrid coil is provided.

In view of the reference to the above-quoted papers, it is felt that no further description of FIG. 3 is needed.

It is to be understood that the foregoing description of specific examples of this invention is not to be considered as a limitation of its scope.

We claim:

1. An automatic telecommunication exchange, comprising telecommunication connections set up via time-division multiplex paths, each said connection using a separate path for the two directions of transmission, means for setting up each connection by inter-connecting the calling line and the wanted line via a switching stage, each switching stage including a switch for handling only the intelligence to be conveyed in one of said directions of transmission, the switches for said two directions of transmission being physically separated from each other, means to set up a connection via a crosspoint by enabling that crosspoint with a pulse applied thereto at the time position at which the connection is to be set up and conveying signals other than speech by varying the width of the crosspoint control pulses.

2. An exchange as claimed in claim 1, in which supervisory connections are made from common control equipment to the multiplex highways, and said connections are enabled at times within the duration of a channel at which speech is not conveyed, so that separate portions of a channel time are used for speech and for supervision.

* * * * *